US011387863B1

(12) United States Patent
Davies et al.

(10) Patent No.: US 11,387,863 B1
(45) Date of Patent: Jul. 12, 2022

(54) COGNITIVELY ADAPTABLE FRONT-END WITH FPNA ENABLED INTEGRATED NETWORK EXECUTIVE

(71) Applicant: Rockwell Collins, Inc., Cedar Rapids, IA (US)

(72) Inventors: Orion Davies, Cedar Rapids, IA (US); Russell D. Wyse, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/222,572

(22) Filed: Apr. 5, 2021

(51) Int. Cl.
*G06F 9/38* (2018.01)
*H04B 1/7163* (2011.01)
*G06N 3/063* (2006.01)

(52) U.S. Cl.
CPC ......... *H04B 1/71637* (2013.01); *G06N 3/063* (2013.01); *G06F 9/3897* (2013.01)

(58) Field of Classification Search
CPC ........ G06N 3/0445; G06N 3/063; G06N 3/08; G06F 9/3897; G06F 15/76; G06F 15/7867; G06F 9/30003; G06F 9/30145; G06F 9/44505; G06F 12/0811; G06F 12/0875
USPC ....................................................... 375/147
See application file for complete search history.

(56) References Cited

U.S. PATENT DOCUMENTS

| | | | |
|---|---|---|---|
| 7,218,645 B2 | 5/2007 | Lotter et al. | |
| 8,614,603 B1 | 12/2013 | Wyse et al. | |
| 9,240,815 B1 | 1/2016 | Wyse | |
| 9,432,126 B1 | 8/2016 | Wyse et al. | |
| 9,941,959 B2 | 4/2018 | Heath et al. | |
| 10,211,856 B1 | 2/2019 | Petre et al. | |
| 10,516,426 B1 | 12/2019 | Wyse | |
| 10,832,991 B1 | 11/2020 | Cook et al. | |
| 2010/0311435 A1 | 12/2010 | Mueck et al. | |
| 2011/0199191 A1* | 8/2011 | Buckner | G06K 7/10297 340/10.51 |
| 2017/0153892 A1* | 6/2017 | Linsky | G06F 9/3867 |
| 2020/0185318 A1 | 6/2020 | Dadvand et al. | |
| 2022/0058468 A1* | 2/2022 | Gadfort | G06N 3/0445 |

FOREIGN PATENT DOCUMENTS

WO 2020180349 A1 9/2020

OTHER PUBLICATIONS

Zhang, Rui et al., "Water-Based Microchannel and Galinstan-Based Microchannel Cooling Beyond 1kW/cm2 Heat Flux", IEEE Transactions and Components, Packaging and Manufacturing Technology, vol. 5, No. 6, Jun. 2015, 9 pages.

* cited by examiner

*Primary Examiner* — Eva Y Puente
(74) *Attorney, Agent, or Firm* — Suiter Swantz pc llo

(57) ABSTRACT

A system-in-package or multi-chip module architecture that includes a field programmable neural array, that instantiates an instance of a neural network model trained to receive internal observation signals from a digitally controlled integrated circuit, and rapidly generate corresponding system settings to optimize desired characteristics. The system continuously adapts system settings to environmental conditions via a feedback loop of observation signals. The field programmable neural array may also receive observation signals external to the module to generate system settings based on factors not otherwise definable by internal signal characteristics.

20 Claims, 3 Drawing Sheets

COGNITIVELY ADAPTABLE FRONT-END WITH FPNA ENABLED INTEGRATED NETWORK EXECUTIVE

BACKGROUND

Radio frequency (RF) systems must increasingly deal with a dynamically contested spectrum due to interference by adversarial conditions when operating in contested battlespace, self-interference from adjacent systems on the same platform, and congested spectrum from commercially allocated spectral traffic. Radio systems need analog front-ends that can adapt their operating characteristics in rapid response to dynamic changes in the spectral environment.

Existing solutions are computationally intensive, and may be slow to adapt to environmental conditions.

SUMMARY

In one aspect, embodiments of the inventive concepts disclosed herein are directed to a system-in-package or multi-chip module having a field programmable neural array. The field programmable neural array houses instances of trained neural network models to receive internal observation signals from a digital control circuit and rapidly generate corresponding system settings to optimize desired characteristics. The system continuously adapts system settings to environmental conditions via a feedback loop of observation signals action signals.

In a further aspect, the trained neural network residing in the field programmable neural array receives external observation signals.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
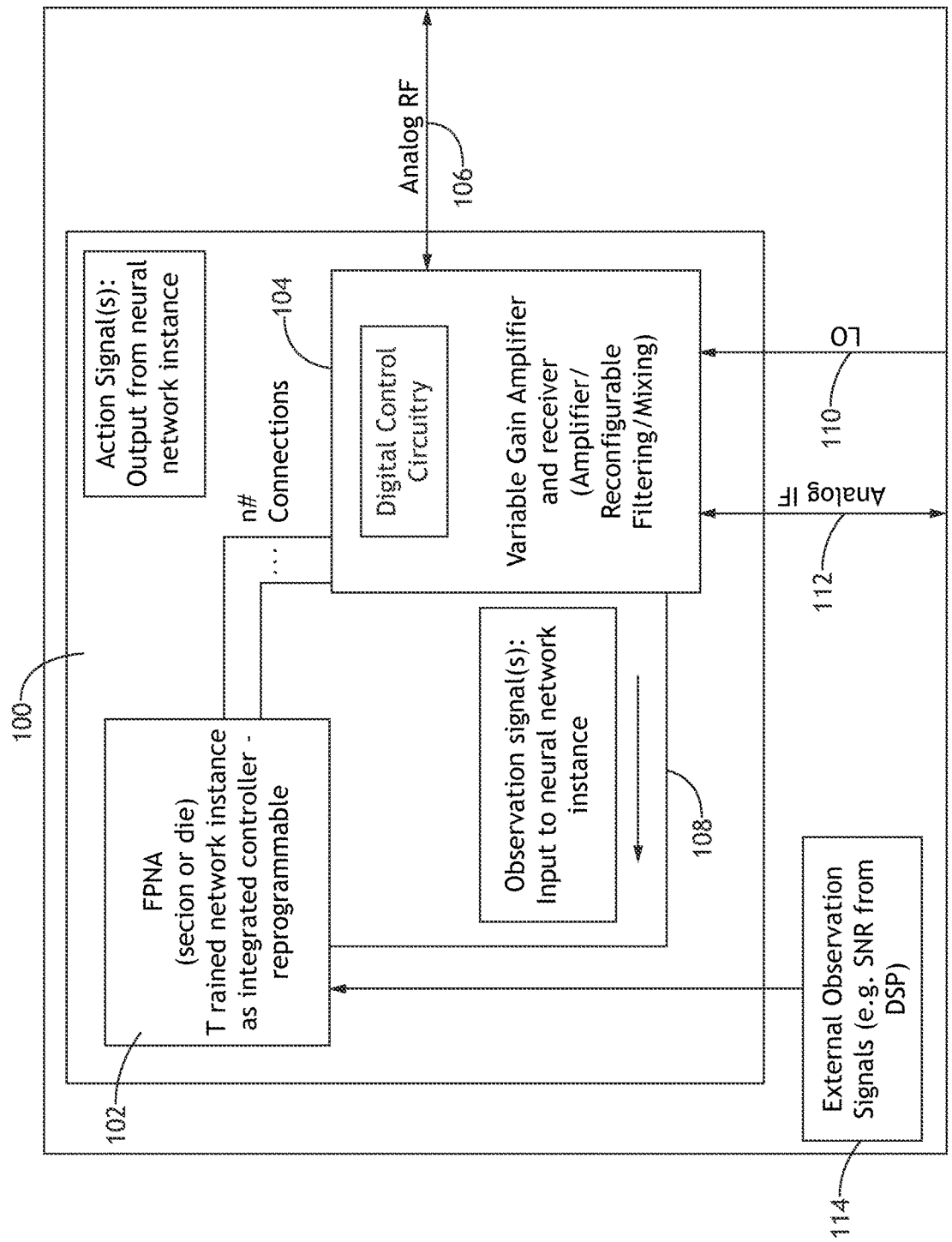
FIG. 1 shows a block diagram of multi-chip module according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1 a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system-in-package or multi-chip module having a field programmable neural array. The field programmable neural array houses instances of neural network models trained to receive internal observation signals from a digital control circuit and rapidly generate corresponding system settings to optimize desired characteristics. The system continuously adapts system settings to environmental conditions via a feedback loop. In a further aspect, the trained neural network residing in the field programmable neural array receives external observation signals.

Referring to FIG. 1, a block diagram of a multi-chip module architecture 100 according to an exemplary embodiment is shown. The multi-chip module 100 includes a field programmable neural array 102 that houses a neural network model trained to receive internal observation signals 108 from the receiver circuitry 104 and produce system settings for the digital control interface to the receiver circuitry 104 to produce desirable operating performance characteristics. Such internal observation signals 108 may comprise existing system settings, mission requirements, characteristics of a local oscillator 110, characteristics of an analog intermediate frequency driving the digital control circuit 104, etc. The digital control circuit 104 may comprise a system for reconfigurable analog front-end filtering including bandpass and notch filter shapes, gain, linearity, wideband frequency coverage, mixer modes. Such systems may be more fully understood with reference to U.S. Pat. Nos. 9,432,126; 9,240,815; and 8,614,603.

In at least one embodiment, the field programmable neural array 102 contains instances of neural network models further trained to receive external observation signals 114 about the environment such as signal strength, signal-to-noise ratios from a digital signal processor, measures of interference, etc. The field programmable neural array 102 may be reprogrammable to accommodate different versions of trained neural network models for various system observation signal inputs and various digital control action signal outputs. Furthermore, the neural network instance residing in the field programmable neural array 102 may be periodically retrained for faster or more accurate settings within a defined set of possible internal observation signals 108 and external observation signals 114.

The multi-chip module 100 may perform simultaneous or time-interleaved multifunction missions by continuously reconfiguring the digital control circuit 104. The field programmable neural array 102 may determine new settings for the digital control interface of the integrated circuits 104 with very little latency due to the lack of software in the control loop. Furthermore, the complexity of the analysis process is reduced by removing programming aspects of the parameter space.

In at least one embodiment, the digital control interface circuitry 104 is configured via the field programmable neural array outputs for ultra-wideband reception (2 GHz instantaneous bandwidth). The field programmable neural array 102 may be connected to the receiver circuitry 104 via a bus of any number of connection channels. The number of channels may be defined by the number of output parameters of the field programmable neural array 102.

Embodiments of the present disclosure allow a platform to engage targets with shorter dwell times, improve mission survivability in the presence of electronic attack, operate collaboratively within an allocated spectrum.

Figure 2:
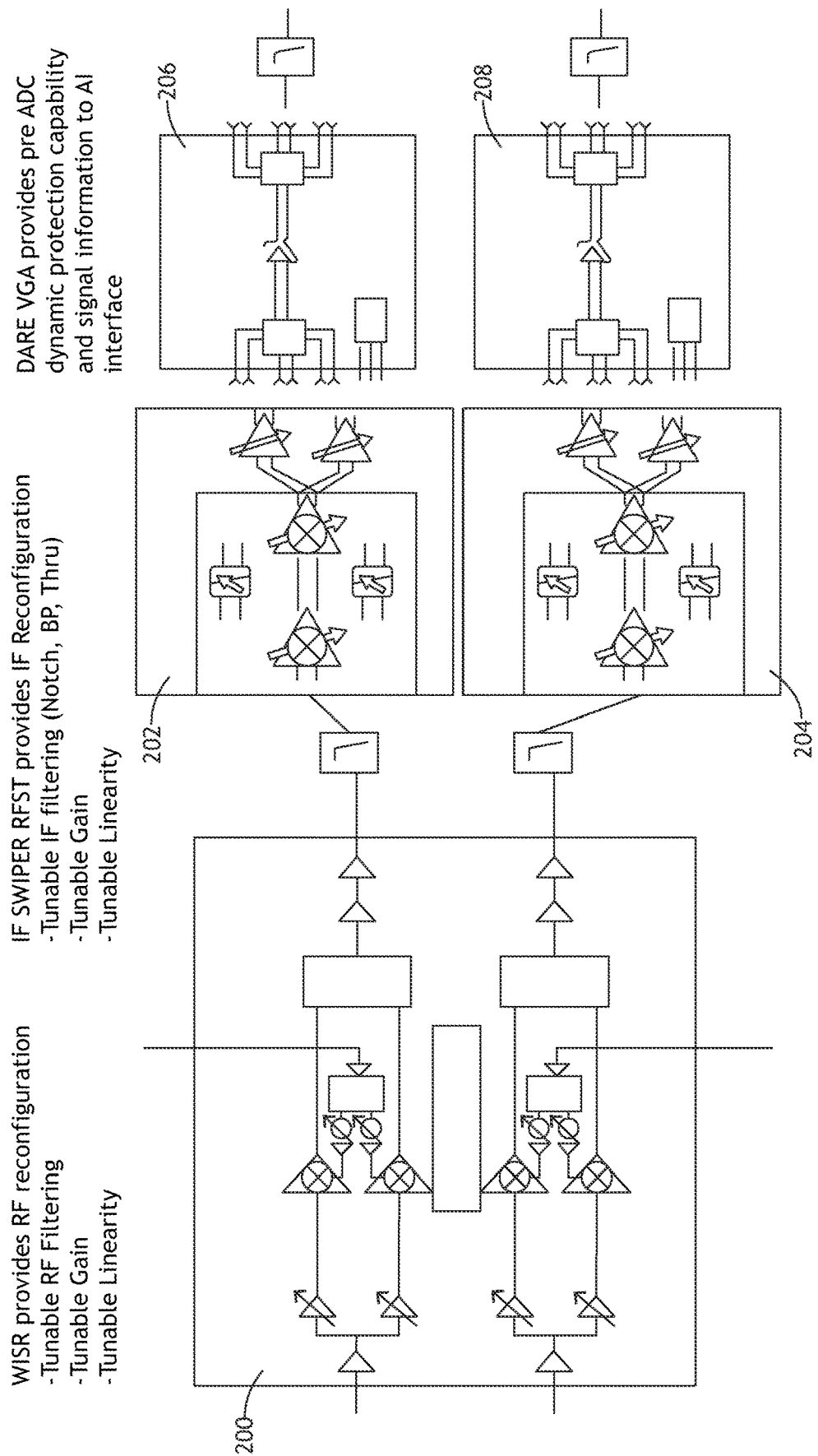
FIG. 2 shows a radio frequency integrated circuit useful for implementing exemplary embodiments.

Referring to FIG. 2, radio frequency integrated circuit topologies useful for implementing exemplary embodiments are shown.

In one embodiment, in an environment with undesired sideband jamming, a trained field programmable neural array may produce settings to the reconfigurable receiver 200 and tunable filter 202, 204 elements to convert the jamming signal intermediate frequency range away from the desired sideband. In one exemplary embodiment, the reconfigurable receiver 200 is configured for 13 dB gain conversion and 50 dB wideband image rejection (13−50=−37 dB). A local oscillator of 9.9 GHz to receive a desired signal at 9.3 GHz and −60 dBm may require an intermediate frequency of 600 MHz at −47 dBm. An out-of-band jamming signal at 10.5 GHz and −10 dBm would lead to an intermediate frequency of 600 MHz at −47 dBm; the desired signal would be swamped by the jamming signal. Adjusting two paired settings on the reconfigurable receiver 200 may adjust the RF behavior to improve rejection of the jamming signal frequency where the problem signal is located. RF tuned image filtering can be increased to greater than 70 dBc (an additional 20 dBc of image rejection at the jammer frequency) and the jamming signal intermediate frequency contribution drops an additional 20 dB to −67 dBm (20 dB below the desired signal level); the signal-to-noise ratio is thereby restored.

In one exemplary embodiment, in an environment with undesired in-band jamming, the trained neural network model residing in the field programmable neural array may produce settings to the reconfigurable receiver 200 and tunable filter 202, 204 elements to reject strong undesired in-band signals that can jam or overwhelm analog-to-digital converters. A local oscillator at 17 GHz high-side pass/low-side reject configuration may pass both a desired signal and a jamming signal to in-band intermediate frequencies as both are on the high-side. An intermediate frequency (IF) tunable filter 202, 204 is adjusted from a through-path configuration to a bandpass filter configuration (passing a narrowband around the desired frequency and rejecting the jammer) or notch filter configuration (reducing just the jammer frequency but passing the rest of the desired bandwidth) to reduce the level of the jamming signal.

In one exemplary embodiment, in an environment with undesired dual in-band jamming, the trained neural network model residing in the field programmable neural array may produce settings to the reconfigurable receiver 200 and tunable filter 202, 204 elements to reject strong undesired in-band signals that can jam or overwhelm analog-to-digital converters. A local oscillator at 17 GHz high-side pass/low-side reject configuration may pass both a desired signal and the jamming signals to in-band intermediate frequencies. An intermediate frequency (IF) tunable filter 202, 204 is adjusted from a high gain through-path configuration to a lower gain configuration with dual notches at the jammer IF frequencies to reduce the level of the jamming signals while increasing the desired IF frequency signal levels to such a level that maximizes the desired signal level but does not saturate the analog-to-digital converters with the composite signals of the desired signal and jammer signal.

In at least one embodiment, the integrated circuit may be configured for auto leveling to supply a direct feedback to the field programmable neural array and produce real-time response adaptation based on internal observation signals. Furthermore, the field programmable neural array may receive external signals from the larger radio system.

Figure 3:
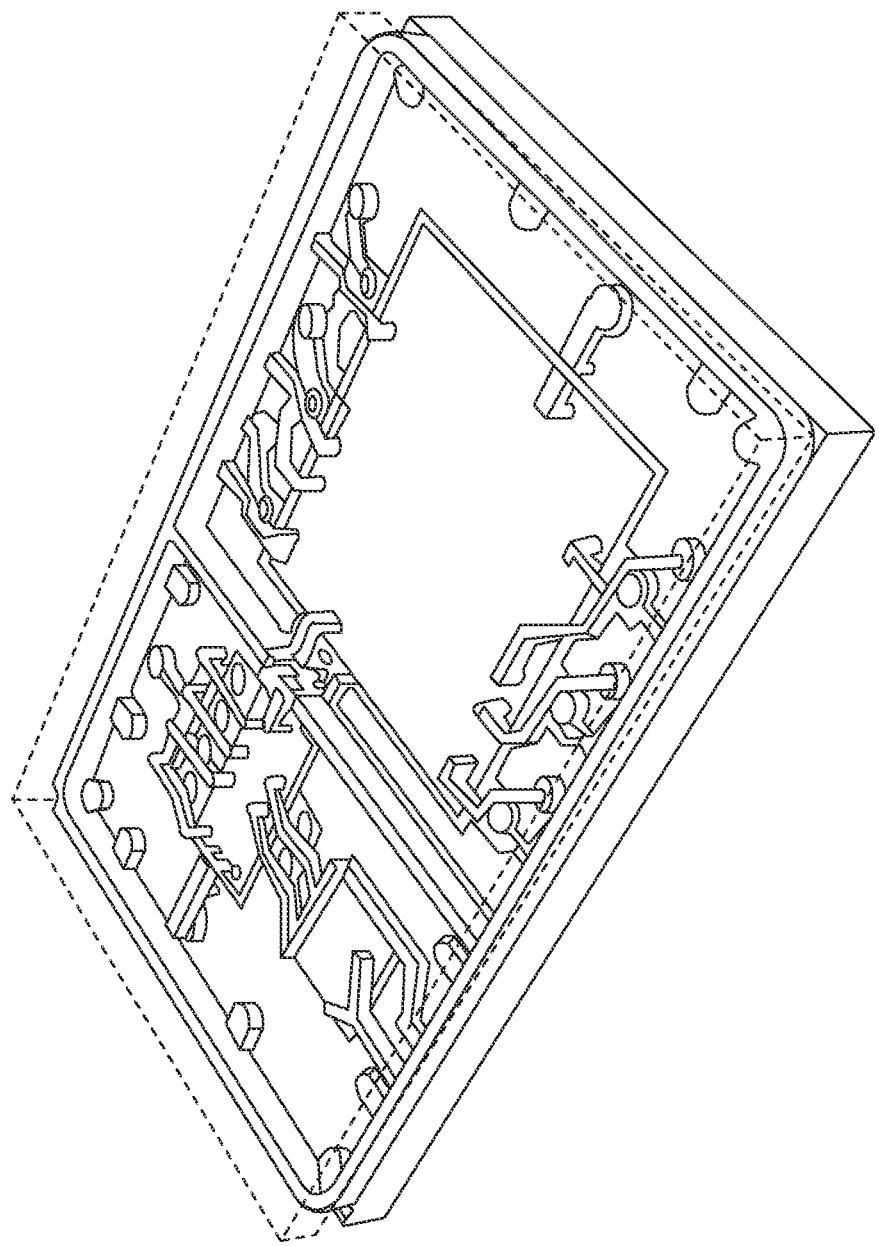
FIG. 3 shows a perspective representation of a multi-chip module produced via an electroformed die attach process according to an exemplary embodiment.

Referring to FIG. 3, a perspective representation of a multi-chip module produced via an electroformed die attach process or active integration process according to an exemplary embodiment is shown. The electroformed die attached multi-chip module integrates a field programmable neural array fabric to the digital control interface circuit, the neural network model residing on the field programmable neural array is trained to mitigate interference or jamming. The system may be more fully understood with reference to U.S. Pat. No. 10,516,426. In at least one embodiment, interconnects between signal pads are grown via deposition processes.

The neural network model residing on the field programmable neural array may utilize reinforcement learning, test equipment hardware, radio system hardware, operational processes, and reinforcement learning algorithms that interact with a reconfigurable front-end receiver system. The hardware components comprise the learning environment and control signals to system components such as digital-to-analog converters comprise the potential actions of the field programmable neural array outputs. In at least one embodiment, outputs from the field programmable neural array are in direct electrical communication with the digital-to-analog converters. Direct electrical connectivity eliminates the need for data registers, clocking, and addressing.

An electroform die attached multi-chip module provides short electrical paths as compared to wire bonded integrated circuits. Furthermore, heat conduction channels may be defined by the die underneath the integrated circuit components. In at least one embodiment, such channels may comprise microfluidic coolant.

In at least one embodiment, the system produces intermediate frequency outputs compatible with 1st Nyquist Zone high speed, direct sampling analog-to-digital converters, and compatible with reconfigurable intermediate frequency filtering and switching to enable tunable notches and bandpass configurations and system gain and linearity control.

Embodiments may enable high dynamic range with wider RF and instantaneous bandwidth up to 1.4 GHz, and tunable image rejection. Embodiments may enable reconfigurable high-side/low-side local oscillator mixing; programmable power consumption for optimizing power dissipation and flexible power supply options based on required linearity; and reconfigurable RF and intermediate frequency filtering.

Embodiments may eliminate the need for mission planning and predetermine lookup tables for reconfiguration settings, or the need to physically remove the receiver system from a platform for it to be reconfigured for different use cases.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A System-in-Package (SiP) or Multi-Chip-Module (MCM) integrated circuit architecture comprising:
   a digitally controlled ultra-wideband receiver;
   a digitally reconfigurable filtering element; and
   a field programmable neural array that houses an instance of a trained neural network model to:
      continuously receive internal observation signals defined by the ultra-wideband receiver and the reconfigurable filtering element;
      process the internal observation signals to determine one or more action signals to apply settings to the receiver and reconfigurable filtering element; and
      directly apply the action signals as digital inputs to reconfigure the receiver and reconfigurable filtering element.

2. The integrated circuit of claim 1, wherein the field programmable neural array is further configured to:
   continuously receive external observation signals,
   wherein determining the one or more actions signals to apply settings to the receiver and reconfigurable filtering element further comprises processing the external observation signals.

3. The integrated circuit of claim 1, further comprising one or more digital-to-analog converters, wherein outputs of the field programmable neural array are in direct electrical communication with the one or more digital-to-analog converters.

4. The integrated circuit of claim 1, wherein the field programmable neural array comprises a wirebonded device.

5. The integrated circuit of claim 4, further comprising one or more heat conduction channels.

6. The integrated circuit of claim 5, wherein the conduction channels comprise heatsinks.

7. A system-in-package or multi-chip module comprising:
   an ultra-wideband receiver;
   a reconfigurable filtering element; and
   a field programmable neural array trained to:
      continuously receive internal observation signals defined by the ultra-wideband receiver and the reconfigurable filtering element;
      process the internal observation signals to determine one or more action signals to apply settings to the receiver and reconfigurable filtering element; and
      directly apply the action signals to reconfigure the receiver and reconfigurable filtering element.

8. The system-in-package or multi-chip module of claim 7, wherein the field programmable neural array is further configured to:
   continuously receive external observation signals,
   wherein determining the one or more actions signals to apply settings to the reconfigurable filtering element further comprises processing the external observation signals.

9. The system-in-package or multi-chip module of claim 7, wherein the field programmable neural array is reprogrammable to contain different instances of trained neural network models.

10. The system-in-package or multi-chip module of claim 7, wherein the field programmable neural array comprises a wirebonded or electroformed die attached device.

11. The system-in-package or multi-chip module of claim 10, further comprising one or more heat conduction channels defined by an electroformed die attach process.

12. The system-in-package or multi-chip module of claim 11, wherein the heat conduction channels contain a microfluid coolant.

13. A radio comprising:
   an ultra-wideband receiver;
   a reconfigurable filtering element; and
   a field programmable neural array that houses an instance of a trained neural network model to:
      continuously receive internal observation signals defined by the ultra-wideband receiver and the reconfigurable filtering element;
      process the internal observation signals to determine one or more action signals to apply settings to the receiver and reconfigurable filtering element; and
      directly apply the action signals to reconfigure the receiver and reconfigurable filtering element.

14. The radio of claim 13, wherein the field programmable neural array is further configured to:
   continuously receive external observation signals,
   wherein determining the one or more actions signals to apply settings to the reconfigurable filtering element further comprises processing the external observation signals.

15. The radio of claim 13, wherein the field programmable neural array is retrainable by enabling different versions of trained neural network models to be loaded.

16. The radio of claim 13, wherein the field programmable neural array comprises an electroformed die attached device.

17. The radio of claim 16, further comprising one or more heat conduction channels defined by an electroformed die attach process.

18. The radio of claim 17, wherein the conduction channels contain a microfluid coolant.

19. The radio of claim 13, wherein the field programmable neural array comprises a wirebonded device.

20. The radio of claim 19, further comprising one or more heatsinks.

\* \* \* \* \*